J. B. Morgan,
Sash Holder.
No. 112,833.    Patented Mar. 21, 1871.
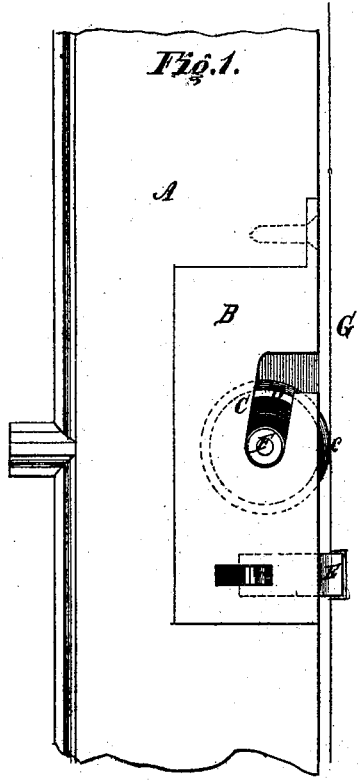
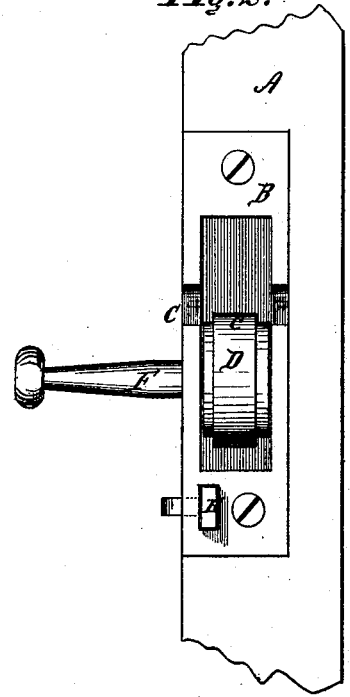
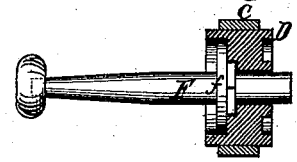
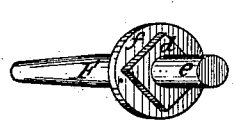
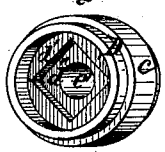
Witnesses.
Inventor.
James B. Morgan
by his attorney

United States Patent Office.

JAMES B. MORGAN, OF DAVENPORT, IOWA, ASSIGNOR TO HIMSELF AND MAURICE J. KEATING, OF ROCK ISLAND, ILLINOIS.

Letters Patent No. 112,833, dated March 21, 1871.

IMPROVEMENT IN SASH-HOLDERS.

The Schedule referred to in these Letters Patent and making part of the same.

*To all whom it may concern:*

Be it known that I, JAMES B. MORGAN, of Davenport, Iowa, have invented certain new and useful Improvements in Sash-Holders or Fasteners; and I do hereby declare that the following is a full, clear, and exact description thereof, reference being had to the accompanying drawing and the letters of reference marked thereon making part of this specification.

Figure 1 is a perspective view, showing the holder attached to a window-sash.

Figure 2 is an end view.

Figure 3 is a sectional view of the axle and wheel.

Figures 4 and 5 are details.

The object of my invention is to provide a means of holding a window-sash at any desirable height.

It consists of a metal frame or case, B, having an inclined slot, C, in each of its sides.

A small wheel, D, covered with rubber or any other suitable material, revolves within this case upon an axle, F, resting in the bottom of the slot C.

The axle is provided with a square shoulder, $d$, fig. 4, fitting into a corresponding countersink, $d''$, fig. 5.

The appliance is to be let into the right-hand end of the window-sash, the end of the axle F projecting toward the operator.

When the window is down the rubber band on the wheel will press lightly against the window-frame.

The axle, being pushed in so far that the square shoulder will fit into the countersink of the wheel, revolves in the bottom of the slot when the window is raised; but as soon as the operator lets go the window the wheel revolves in a contrary direction and the axle is carried upward in the inclined slot, thus increasing the pressure of the wheel against the window-frame, and wedging the window so tightly that it cannot come down even when considerable force is used.

In order to lower the window it is only necessary to raise it slightly, so as to relieve the pressure, and then to pull forward the axle as far as it will come, relieving the shoulder from the countersink.

The axle being now stationary, the wheel will revolve without carrying it up in the slot, as was the case before when the shoulder was in the countersink, and the window will come down easily.

I do not claim the oblique slot, nor the use of the roller or wheel; but

I do claim as of my invention, and desire to secure by Letters Patent—

The shifting-axle F, with shoulder $d$, fitting a corresponding countersink, $d''$, in the wheel or roller, in combination with the oblique or inclined slot, substantially as shown and described, and for the purposes set forth.

In testimony that I claim the above I have hereunto subscribed my name in the presence of two witnesses.

JAMES B. MORGAN.

Witnesses:
JOSEPH B. LEAKE,
JOHN R. CRAWFORD.